J. G. REDFORD.
BAKING OVEN.
APPLICATION FILED NOV. 27, 1908.
976,598.
Patented Nov. 22, 1910.
2 SHEETS—SHEET 1.
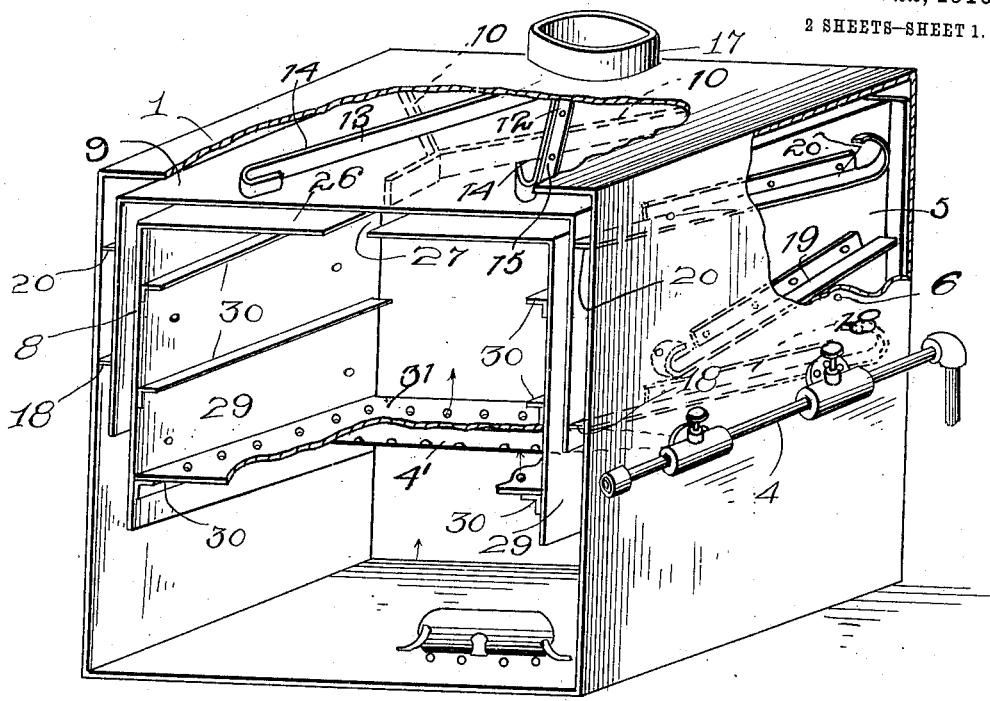
Fig. 1.
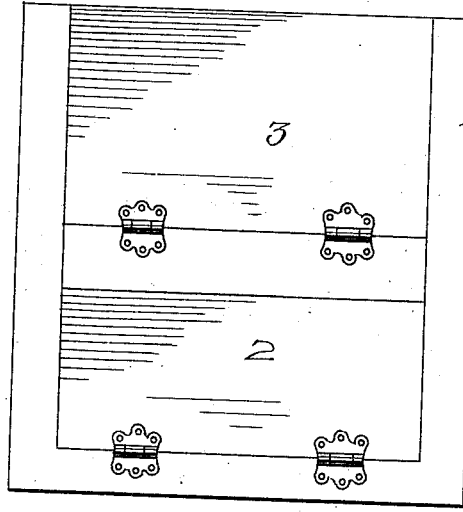
Fig. 2.
Fig. 6.
Witnesses
Inventor
John G. Redford.
By E. E. Crossman
Attorney.

J. G. REDFORD.
BAKING OVEN.
APPLICATION FILED NOV. 27, 1908.

976,598.

Patented Nov. 22, 1910.

2 SHEETS—SHEET 2.

Witnesses

Inventor
John G. Redford.
By E. O. Crosman
Attorney.

UNITED STATES PATENT OFFICE.

JOHN G. REDFORD, OF MILWAUKEE, WISCONSIN.

BAKING-OVEN.

976,598.

Specification of Letters Patent.  Patented Nov. 22, 1910.

Application filed November 27, 1908.  Serial No. 464,661.

*To all whom it may concern:*

Be it known that I, JOHN G. REDFORD, a citizen of the United States, and a resident of Milwaukee, county of Milwaukee, State of Wisconsin, have invented certain new and useful Improvements in Baking-Ovens, of which the following is a specification.

This invention relates to baking ovens, and the principal object of the same is to provide means whereby the products of combustion for the oven will circulate through, over and about the same so that the oven will be thoroughly heated and kept at a uniform temperature.

In carrying out the object of the invention generally stated above it is contemplated providing a casing that is provided with a burner or burners, said casing inclosing a shell which is spaced from said casing, the said shell in turn inclosing an oven which has a perforated bottom for the admission of products of combustion and an opening in its top for the escape of the products of combustion, the said shell being provided with means for causing the products of combustion to circulate over the top of the oven, down its sides thence over the sides of the shell and its top and thence to an outlet provided in said casing, the circulating means provided being arranged so that the oven is surrounded by a heat zone.

In the practical application of the invention it will be understood, of course, that the essential features thereof are necessarily susceptible of changes in details and structural arrangements, one preferred and simple embodiment of which is shown in the accompanying drawings, wherein:—

Figure 3:
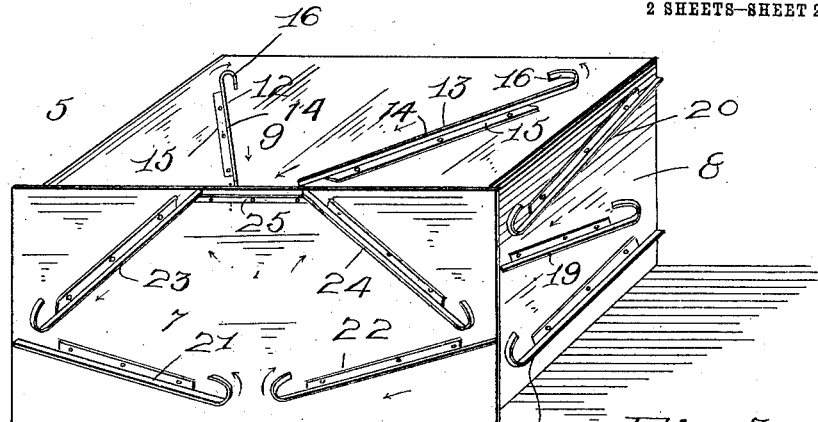
Figure 4:
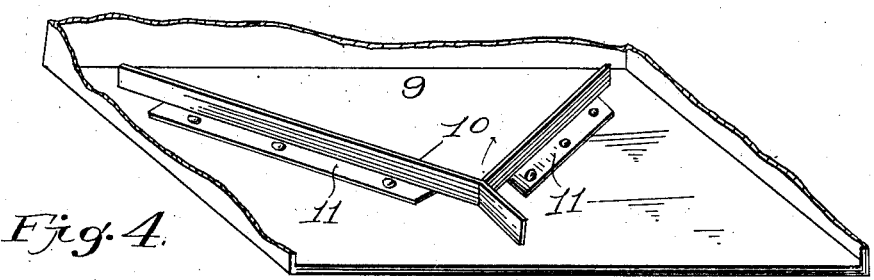
Figure 5:
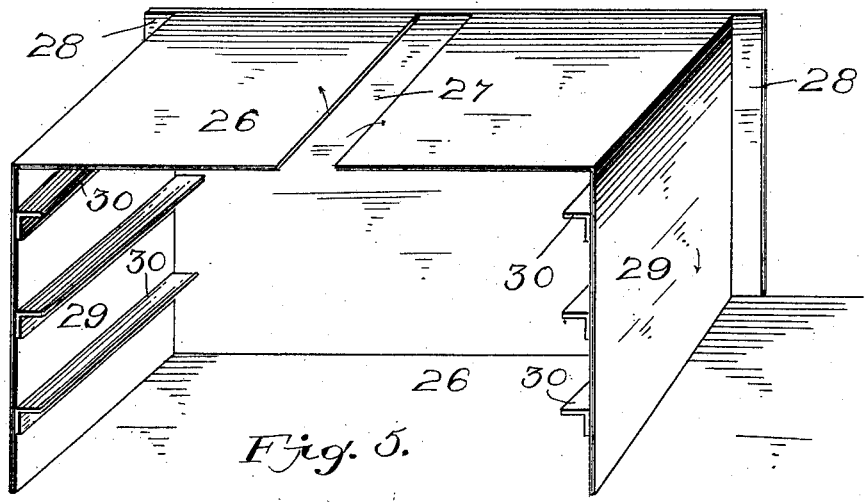

Figure 1 is a perspective view of the improved oven, parts thereof being broken away and the doors being removed to expose the interior thereof. Fig. 2 is a view in front elevation, showing the doors closed. Fig. 3 is a detail perspective view of the circulation shell of the oven. Fig. 4 is a fragmentary perspective view of the top of said shell, viewed from the underside. Fig. 5 is a detail perspective view of the oven, the perforated bottom thereof being removed. Fig. 6 is a similar view showing the type of deflectors used on the top, side and ends of the shell.

Referring to said drawings by numerals, 1 designates a substantially rectangular casing which is equipped with upper and lower doors 2—3 at its front, and has a pipe communication 4 with a source of fuel supply, not shown, said pipe feeding the burner 4' extending across the inside of the casing. A shell 5 having an open bottom and front is supported in spaced relation to the top, bottom, rear end and sides of said casing by means of bolts, or other convenient supporting means 6, the rear 7 of said shell having its ends projecting beyond the sides 8 thereof and contacting with the sides of the casing so that the products of combustion cannot pass from said sides 8 to the rear 7, or vice versa, as will be more fully explained. The under surface of the top 9 of said shell is equipped with a substantially Y-shaped outstanding heat deflector 10 which is centrally located thereon and has flat flanges 11 which are riveted or otherwise rigidly fastened to said top. The upper surface of said top is equipped with two deflectors 12—13, which are duplicates in every respect, each being composed of an outstanding body portion 14 and a flat fastening flange 15 which is riveted or otherwise rigidly fastened to said top. One end of said body portion is in the form of a hook 16, the other end being straight. Said deflectors 12—13 are arranged in divergent relation on the said top, with their straight ends extending to the rear of the shell and being in close proximity and adjacent the outlet 17 in the top of the casing 1. The hook-shaped ends 16 diverge and extend adjacent the front corners of said shell.

The outer face of the sides of the shell are each equipped with three deflectors 18, 19, and 20 which are duplicates in every respect of the deflectors on the top surface of the shell. The upper and the lower deflectors, 20—18, are arranged on a slight incline and in parallel relation with their straight ends extending to the front edge of the side and their hook-shaped ends terminating adjacent the rear. The intermediate deflector 19 is arranged reversely to said deflectors 18—20, its straight end extending to the rear edge of the side, and its hook-shaped end extending adjacent the front edge.

The rear of the shell is equipped with four deflectors 21, 22, 23 and 24, arranged in upper and lower pairs, and which are similar in all respects to the side and top deflectors. The lower pair of deflectors 21—22 are arranged on an incline and in divergent relation, their straight ends extending to the ends of said rear and their hook-shaped ends extending adjacent the lower central portion of the rear and being slightly spaced apart. The upper pair of deflectors 23—24 are also on an incline and in divergent relation, the hook-shaped end extending adjacent the straight end of the deflectors 21—22. The straight ends of said deflectors 23—24 extend to the upper central portion of the said rear and are connected by the outstanding deflecting strip 25.

An open front oven 26 is supported within the shell 5 by the bolts 6 in spaced relation so that there is clearance space between the said oven and shell at the sides, rear and top. Said top has an elongated opening or slot 27 extending across the same, and the rear of the oven has its ends projected as indicated at 28 to contact with the sides of the shell 5. The sides 29 extend well below the sides of the shell 5 and have their inner surface provided with regularly spaced ledges 30 so that the perforated removable bottom 31 may be adjustably supported thereby, or the ledges not in use may serve as supports for shelves, as will be readily understood.

As is shown in Fig. 3, the end hooks of the deflectors at the sides and rear of the shell 5 are all upturned, and said deflectors, as well as the deflectors at the top of the shell 5 contact with the casing and thereby form passages for the products of combustion. When the parts of the oven are assembled it will be seen that the doors 2—3 close oven 26 and the space below, and that the products of combustion pass through the perforated bottom 31 to the interior of oven 26 and escape through the top slot 27 and are caught by the deflector 10 of the top of the shell and are spread thereby so that they will pass downwardly between the sides and rear of the oven and shell, the products of combustion at the sides being prevented from mingling with the products of combustion at the rear by the projecting ends 28 of the rear of the oven. The products of combustion at the sides pass over the lower edges thereof and are caught by the lower deflector 18 and caused to pass around its hook end where they contact with deflector 19 and take a downward course to pass around the hook end of deflector 19, then contact with deflector 20 and are carried downward to and around the hook end thereof, from which they pass over the upper edges of the sides and to the top when the deflectors 12—13 catch the same and deflect them diagonally across the top and around the hook ends so that the side hot air currents will meet between said deflectors and be guided thereby to the passage between their straight ends which is in communication with the products of combustion outlet 17. The products of combustion which come over the lower edge of the rear 7 of the shell 5 contact with the deflectors 21—22 and are conveyed to the contracted passage between their lower-hook-shaped ends, thence enter the space formed by the deflectors 21, 22, 23, 24, and strip 25, and are deflected downwardly by the deflectors 23—24 around their lower hook-shaped ends, then permitted to flow over the upper edges of the shell and contact with the outer side of the deflectors 12—13 and pass around their hook-shaped ends and flow between the same to the passage between their straight ends to the outlet 17.

It will be seen from the foregoing that the described arrangement of deflectors causes the products of combustion to thoroughly circulate over the entire outer surface of the shell 5, which combined with the constant circulation of the products of combustion through the space between the oven and said shell, assures of the oven being thoroughly and uniformly heated.

What I claim as my invention is:—

1. A device of the character described comprising a casing provided with heating means and means for permitting the escape of products of combustion, a shell supported in spaced relation therein, heat deflectors carried by the under and outer surface of the top of said shell and by the sides and rear thereof, an oven inclosed by said shell and supported in spaced relation thereto, said oven being provided with a slotted top for the escape of the products of combustion and a perforated bottom for the admission of the products of combustion.

2. A device of the character described comprising a casing provided with a source of heat and means for permitting the escape of products of combustion, a shell arranged in spaced relation therein and having an open front and bottom, an upper, lower and intermediate heat deflector carried by each side of said shell, a pair of divergent deflectors carried by the top of said shell, upper and lower pairs of divergent deflectors carried by the rear of said shell, a deflector carried by the under surface of the top of said shell, an oven supported within said shell in spaced relation thereto and provided with a slotted top for delivering the products of combustion to the deflector on the under surface of the top of said shell, and a perforated bottom for said oven for admitting the products of combustion to the interior thereof.

3. A device of the character described comprising a casing having an outlet in its top, a shell supported in spaced relation within said casing, an oven inclosed by said shell which receives the products of combustion and delivers the same to the deflectors on the under surface of the top of the shell, a deflector carried by the under side of the top of said shell for causing the products of combustion to flow down the sides and rear of said shell, deflectors on the sides of said shell for causing the products of combustion to have a tortuous passage up the outer surface of said sides, deflectors on the rear for causing the products of combustion to go up and down said rear and deliver the same to the top of the shell, the latter being provided with means for preventing the products of combustion from the sides and rear passing around the ends of said rear, and deflectors on the outer surface of the top of the shell for receiving the products of combustion from said sides and rear and delivering the same to the outlet of the casing.

4. A device of the character described comprising a casing provided with a source of heat and means for permitting the escape of products of combustion, a shell therein provided with heat deflectors on the outer surface of its sides and end and on the outer and inner surfaces of its top, means carried by the rear of said shell for preventing communication between the side spaces and the rear space formed between said shell and casing, an oven supported in spaced relation within said shell and provided with a bottom inlet and a top outlet for the products of combustion, and means carried by the rear of said oven for preventing the products of combustion passing from its sides to said rear.

5. A device of the character described comprising a casing provided with a source of heat, and provided with a top outlet, a shell supported in spaced relation therein, a substantially Y-shaped deflector carried by the under surface of the top of said shell for diverting the products of combustion down the sides and rear of the said shell, an oven supported in spaced relation within said shell and provided with means for admitting the products of combustion and for discharging the same to said Y-shaped deflector, heat deflectors carried by the outer surface of the sides and the rear of the shell for diverting the products of combustion over and up their surfaces, and heat deflectors on the outer surface of said top for receiving and guiding the products of combustion from said sides and rear to said casing outlet.

6. A device of the character described comprising a casing provided with a source of heat and with a discharge outlet, a shell supported in spaced relation therein, an oven supported in spaced relation within said shell and provided with a slotted top, a perforated bottom adjustably supported within said oven, deflectors for the products of combustion carried by the outer surface of the sides of said shell, said deflectors being reversely arranged in staggered relation, upper and lower pairs of deflectors carried by the rear of said shell, the members of said pairs of deflectors being arranged in divergent relation, a deflector on the under surface of the top of said shell, and a pair of divergently arranged deflectors on the outer surface of said top for delivering the products of combustion to said casing outlet.

7. A device of the character described comprising an oven, a shell surrounding the same in spaced relation and provided with heat deflectors on both surfaces of its top and the outer surfaces of its sides and rear, the deflectors at the sides, rear, and outer surface of the top having a straight outstanding body and a hook-shaped end, and a casing surrounding said shell in spaced relation and provided with a source of heat and means for permitting the escape of products of combustion.

JOHN G. REDFORD.

In presence of—
P. L. McAllister,
E. A. Craig.